United States Patent Office.

IGNAZ ROSENBERG, OF BIEBRICH, GERMANY, ASSIGNOR TO KALLE & CO., OF SAME PLACE.

REDDISH-VIOLET DYE.

SPECIFICATION forming part of Letters Patent No. 588,181, dated August 17, 1897.

Application filed July 29, 1896. Serial No. 600,980. (Specimens.) Patented in England May 7, 1895, No. 9,103, and in France May 22, 1895, No. 247,626.

*To all whom it may concern:*

Be it known that I, IGNAZ ROSENBERG, residing at Biebrich-on-the-Rhine, in the Empire of Germany, have invented certain new and useful Improvements in the Manufacture of Tetrazo Dyestuffs from Diamins and 1.3 Naphthylenediamin Mono or Di Sulfo-Acids, (for which Letters Patent have been obtained in England, No. 9,103, dated May 7, 1895, and in France, No. 247,626, dated May 22, 1895,) of which the following is an exact and clear description.

By combining the 1.3 naphthylenediamin mono and di sulfo-acids described in my simultaneous application, filed July 29, 1896, Serial No. 600,978, and characterized by containing the two amido groups in meta or 1.3 position with tetrazo bodies I have succeeded in producing a new class of tetrazo dyestuffs which are of great value in the arts. All these dyestuffs possess the important property of dyeing unmordanted cotton. They are distinguished by their great tinctorial power, by their great affinity to the fiber, by producing bright and even shades which are extremely fast to light, washing, and alkali and which are much faster to acids than the corresponding dyestuffs made from other naphthylenediamin sulfo compounds.

For the production of the new coloring-matters which are the subject of this application I combine either in alkaline or in weakly-acid solution one molecular proportion of any of the well-known tetrazo bodies which are usually employed for the production of substantive dyestuffs with two molecular proportions of a 1.3 naphthylenediamin mono or di sulfo-acid. The shades of the so-formed tetrazo dyestuffs vary from bluish-red to blue and dark-violet or black shades.

The 1.3.6 naphthylenediamin-monosulfo-acid produces, on combination with tetrazotized benzidin or tolidin, bluish-red dyestuffs. With dianisidin it gives a red violet and with paraphenylenediamin a violet.

In carrying out my process practically I proceed as follows:

Example: The tetrazo solution obtained in the usual manner from 12.2 kilos dianisidin is run into a cold aqueous solution of twenty-five kilos 1.3.6 naphthylenediamin-monosulfo-acid and twenty kilos soda-ash. It is then salted out, filtered off the salt liquor, pressed, and dried. After drying and grinding it forms a black bronzy powder easily soluble in hot water, insoluble in alcohol, soluble in concentrated sulfuric acid with blue coloration. On alkaline reduction with zinc-dust it gives a colorless solution which turns brown under the influence of the air. It dyes a bright-reddish violet on unmordanted cotton.

The dyestuff may be rediazotized on the fiber and combined with suitable amins or phenols, such as beta-naphthol, metatoluylenediamin, naphthylamin ether, or other similar bodies as are usually employed in the arts for this purpose. Shades ranging from dark brown to black which are deeper and still faster against light, washing, and acids than the original shades are obtained in this manner.

Now what I claim is—

1. The process of producing new tetrazo dyestuffs consisting in combining molecular proportions of tetrazotized diamins, employed in the manufacture of tetrazo dyestuffs, with bimolecular proportions of 1.3 naphthylenediamin - sulfo - acids, substantially as described.

2. The process of producing the specific tetrazo dyestuff having the formula:

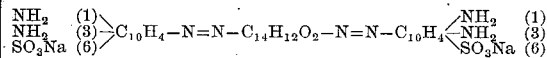

by combining one molecular proportion of tetrazotized dianisidin with two molecular proportions of 1.3.6 naphthylenediamin-monosulfo-acid substantially as described.

3. A new dye derived from the herein-described 1.3 naphthylenediamin mono or di sulfo-acids, which, after drying and powdering, form black bronzy powders, easily soluble in hot water, insoluble in alcohol, soluble in concentrated sulfuric acid with blue coloration, giving, on alkaline reduction with zinc-dust colorless solutions, which turn brown under the influence of air, dyeing unmordanted cotton, bright-reddish violet, which on treatment with nitrous acid in combination with metatoluylenediamin in weakly-acid solution is changed into a deeper brownish-violet shade, substantially as described.

4. The new substantive dyestuff with the formula:

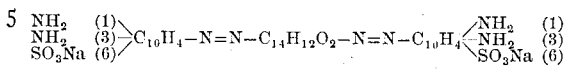

which dyestuff is producible by combining molecular proportions of tetrazotized diamisidin with bimolecular proportions of 1.3.6 naphthylenediamin-monosulfo-acid, which color after drying and pulverizing forms a black bronzy powder, easily soluble in hot water, insoluble in alcohol, soluble in concentrated sulfuric acid with blue coloration, giving, on alkaline reduction with zinc-dust a colorless solution, which turns brown under the influence of the air; dyeing unmordanted cotton a bright-reddish violet, which on treatment with nitrous acid and combination with metatoluylenediamin in weakly-acid solution is changed into a deeper brownish-violet shade and having all the qualities substantially as described.

In testimony whereof I have signed my name to this specification in the presence of two subscribing witnesses.

IGNAZ ROSENBERG.

Witnesses:
FRIEDRICH KNECKE,
HEINRICH MISCHLER.